(12) United States Patent
Takahashi et al.

(10) Patent No.: US 8,154,325 B2
(45) Date of Patent: Apr. 10, 2012

(54) SEMICONDUCTOR INTEGRATED DEVICE AND CONTROL METHOD THEREOF

(75) Inventors: Atsushi Takahashi, Kanagawa (JP); Takao Kondo, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 12/884,973

(22) Filed: Sep. 17, 2010

(65) Prior Publication Data

US 2011/0102027 A1     May 5, 2011

(30) Foreign Application Priority Data

Sep. 18, 2009   (JP) ................................. 2009-217058

(51) Int. Cl.
*H03L 7/00*   (2006.01)
(52) U.S. Cl. ........................................ 327/142; 327/198
(58) Field of Classification Search .......... 327/142–144, 327/198
See application file for complete search history.

(56) References Cited

U.S. PATENT DOCUMENTS

| | | | |
|---|---|---|---|
| 6,326,823 B1 | 12/2001 | Okui | |
| 6,480,967 B1 | 11/2002 | Jensen et al. | |
| 6,639,436 B2 * | 10/2003 | Yamada et al. | 327/142 |
| 6,771,100 B2 * | 8/2004 | Ishimi | 327/142 |
| 7,038,506 B2 * | 5/2006 | Om et al. | 327/145 |
| 2005/0116754 A1 | 6/2005 | Ichikawa | |

FOREIGN PATENT DOCUMENTS

JP        8-185244 A        7/1996

OTHER PUBLICATIONS

Anderson D: "Reset ICS Create Sequenced or Long Resets", EDN Electrical Design News, Reed Business Information, Highlands Ranch, CO, US, vol. 42, No. 24, Nov. 20, 1997 p. 106.
European Search Report dated Nov. 7, 2011 issued by the European Patent Office in counterpart European Patent Application No. 10009506.6.

* cited by examiner

*Primary Examiner* — An Luu
(74) *Attorney, Agent, or Firm* — Sughrue Mion, PLLC

(57) ABSTRACT

Provided is a semiconductor integrated device that selects one or more of a plurality of functional blocks and resets the selected functional block, and a control method of the semiconductor integrated device. The semiconductor integrated circuit includes a functional block that is reset when a clock signal and a reset signal are supplied, a reset signal output unit that outputs the reset signal for resetting the functional block, a clock mask circuit that stops the clock signal to be supplied to the functional block, and a clock mask control circuit that controls the clock mask circuit.

17 Claims, 4 Drawing Sheets

SEMICONDUCTOR INTEGRATED DEVICE AND CONTROL METHOD THEREOF

INCORPORATION BY REFERENCE

This application is based upon and claims the benefit of priority from Japanese patent application No. 2009-217058, filed on Sep. 18, 2009, the disclosure of which is incorporated herein in its entirety by reference.

BACKGROUND

1. Field of the Invention

The present invention relates to a semiconductor integrated device and a control method thereof. In particular, the present invention relates to a semiconductor integrated device that includes a plurality of functional blocks for carrying out one function, and a control method thereof.

2. Description of Related Art

When resetting a system LSI, since the internal circuits of the system LSI are activated at a time, a large current is instantaneously generated. The current value is proportional to the circuit size. Therefore, along with the increased size of the system LSI, the current generated inside the system LSI also increases at the time of reset. As a result, a power supply voltage drop generated inside the system LSI circuit causes unstable operation, and thereby disabling to reset correctly sometimes.

If the current generated inside the system LSI circuit increases, higher specifications are required for an external power supply circuit of the system LSI in terms of the current variation and a maximum current value at the time of reset. This seriously affects when building the system including such system LSI.

For such problem, Japanese Unexamined Patent Application Publication No. 8-185244 (Hanaoka) discloses a semiconductor integrated device that divides the internal circuits into a plurality of blocks by function and resets the functional blocks by each functional block, and the control method thereof. FIG. 4 illustrates a configuration of a semiconductor integrated device 100 according to a related art. In the semiconductor integrated device 100 of the related art, a plurality of functional blocks KA to KN are controlled by one control system. The semiconductor integrated device 100 includes a selective reset unit 101 which selects and resets the functional block. The selective reset unit 101 measures the number of edge or edge interval of a reset signal, and if the measurement result matches any of predetermined setting values, the selective reset unit 101 resets the functional block corresponding to the matched setting value. At the time of resetting the functional blocks KA to KN, the semiconductor integrated device 100 changes the timing to supply the reset signal to the functional blocks. By selecting the functional blocks KA to KN and resetting the selected functional block, it is possible to prevent activation of the internal circuits at a time, and a large current from flowing inside the internal circuits.

SUMMARY

However, in the technique disclosed by Hanaoka, even when a part of the blocks are in a reset state, other blocks continue to operate. In the case of the plurality of functional blocks performing one operation, the functional blocks operate by inputting or outputting signals to each other. If only a part of the functional blocks are reset, the signal output to the functional block operating normally from the functional block already reset will be abnormal, and the signal output to the functional block already reset from the functional operating normally will also be abnormal. Therefore, the signals input or output between the functional block already reset and the functional block operating normally could cause a malfunction in the functional block. Accordingly, it is necessary to divide the functional blocks to the extent not to influence mutual operations. The present inventor has found a problem that in the case of the system LSI in which the functional blocks input or output signals with each other, the functional blocks cannot be divided and reset by each functional block.

An exemplary aspect of the present invention is a semiconductor integrated device that includes a plurality of functional blocks, a reset signal output unit that outputs a reset signal for resetting the plurality of functional blocks, a clock mask circuit that stops a clock signal, the clock signal being supplied to the plurality of functional blocks, and a clock mask control circuit that controls the supply of the clock signal by the clock mask circuit to the plurality of functional blocks. At least one of the functional blocks inputs or outputs a signal with other functional blocks, and the functional blocks are reset when the clock signal and the reset signal are supplied. The reset signal output unit supplies the reset signal to the plurality of functional blocks concurrently with or after the clock signal supply to the plurality of functional blocks is stopped. Further, the clock mask control circuit sequentially selects one or more of the functional block to reset among the plurality of functional blocks in which the supply of the clock signal is stopped and the reset signal is supplied.

Another exemplary aspect of the present invention is a control method of a semiconductor integrated device including a plurality of functional blocks in which at least one of the functional blocks inputs or outputs a signal with other functional blocks and the functional blocks are reset when a clock signal and a reset signal are supplied, in which the method includes stopping supply of the clock signal to the plurality of functional blocks, supplying the reset signal to the plurality of functional blocks concurrently with or after stopping the supply of the clock signal, and sequentially selecting one or more of the functional block to reset among the functional blocks in which the supply of the clock signal is stopped and supplied with the reset signal, and supplying the clock signal to the selected functional block.

In the present invention, before resetting the functional block, the supply of the clock signal to the functional blocks is stopped, so as to stop the signal input or output with other functional block, and thereby preventing a malfunction. In addition, the reset signal is input to the functional block in which supply of the clock signal is stopped, and the functional block to reset is selected to be supplied with the clock signal. Thus, it is possible to arbitrarily select the functional block among the plurality of functional blocks that input and output signals to each other.

The present invention provides a semiconductor integrated device that is capable of selecting one or more among plurality of functional blocks and resetting the selected functional block, and the control method of the semiconductor integrated device.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

[First Exemplary Embodiment]

Figure 1:
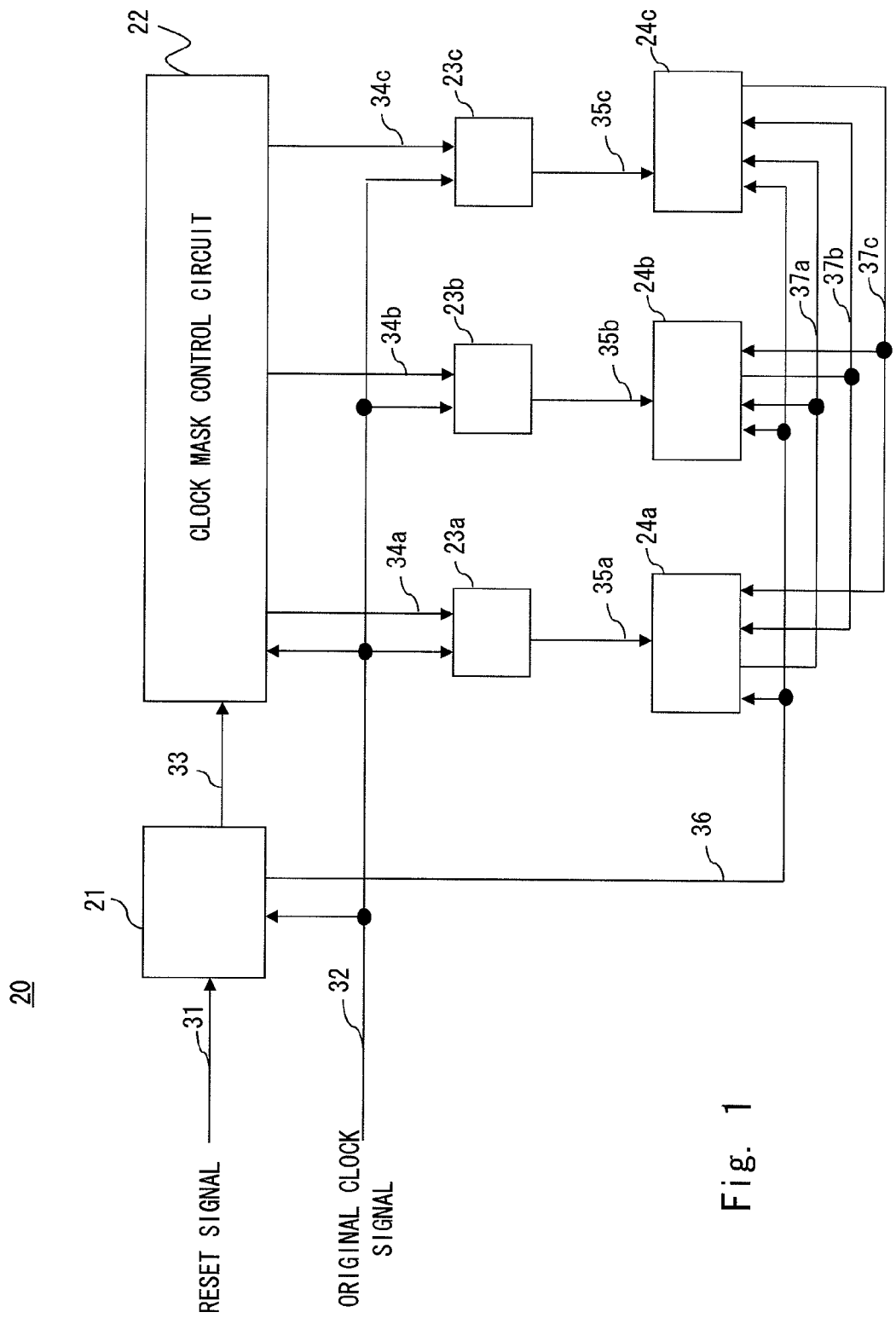
FIG. 1 is a block diagram illustrating a semiconductor integrated device according to a first exemplary embodiment.
Figure 2:
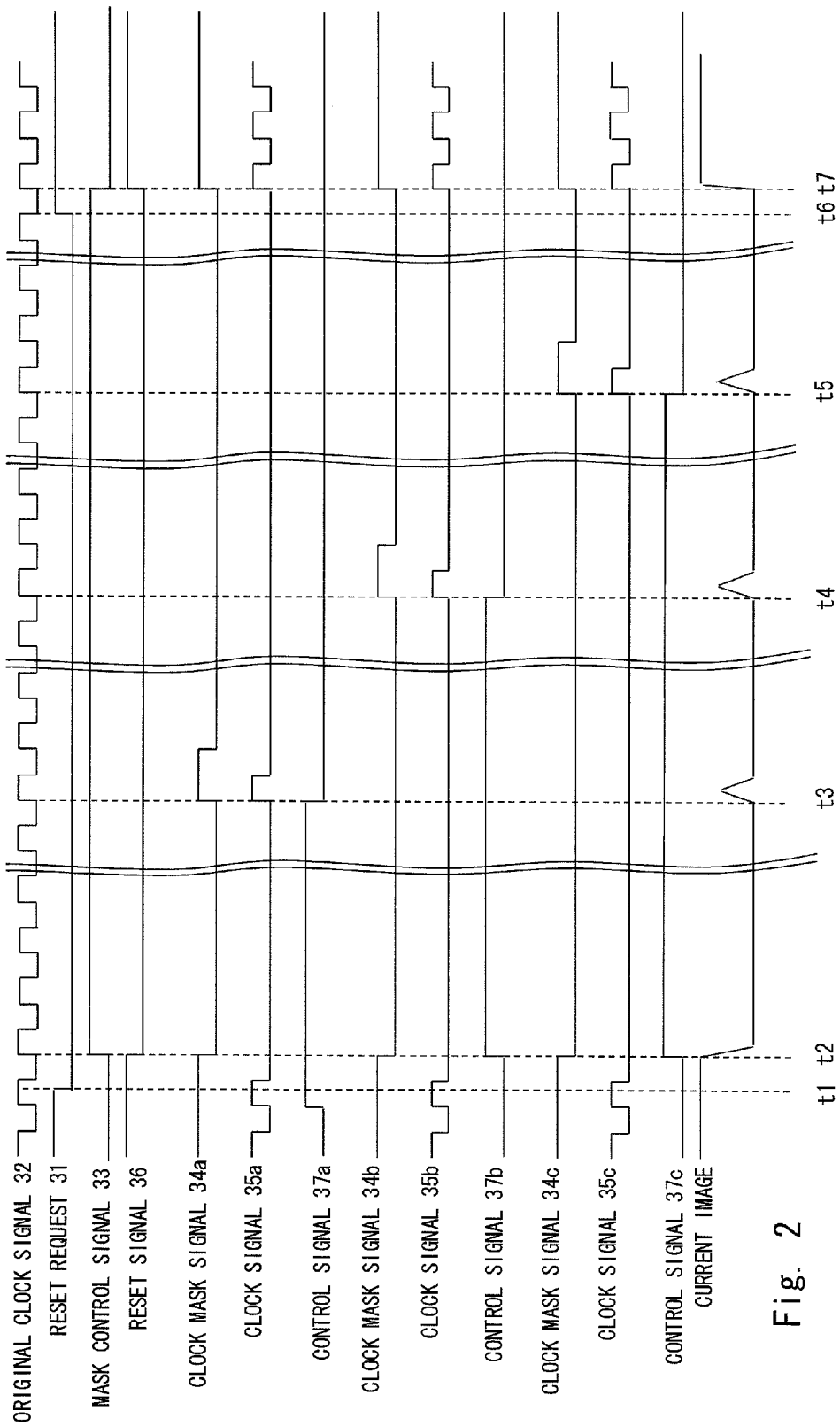
FIG. 2 is a timing chart according to the first exemplary embodiment.

Hereinafter, exemplary embodiments of the present invention are described with reference to the drawings. FIG. 1 is a block diagram illustrating a semiconductor integrated device 20. The semiconductor integrated device 20 according to this exemplary embodiment includes a plurality of functional blocks 24a to 24c, and a reset signal output unit 21 which outputs a reset signal 36 for resetting the functional blocks 24a to 24c. The semiconductor integrated device 20 further includes clock mask circuits 23a to 23c which stop clock signals 35a to 35c supplied to the functional blocks 24a to 24c, and a clock mask control circuit 22 the supply of the clock signals 35a to 35c by the clock mask circuits 23a to 23c to the functional blocks 24a to 24c. At least one of the functional blocks 24a to 24c inputs or outputs control signals 37a to 37c, and the functional blocks reset when the clock signals 35a to 35c and the reset signal 36 are supplied.

The reset signal output unit 21 is connected to the clock mask control circuit 22 and each functional blocks 24a to 24c (hereinafter referred to as the functional block 24 when not necessary to distinguish the functional blocks 24a to 24c). The reset signal output unit 21 is supplied with an original clock signal 32, which is a clock signal, and synchronizes with the original clock signal 32 to operate.

The original clock signal 32 is externally supplied or output by a clock generation circuit (not illustrated) which is mounted inside the semiconductor integrated device 20.

The reset signal output unit 21 receives a reset request 31. The reset request 31 is supplied from outside the system (not illustrated) that includes the semiconductor integrated device 20 mounted therein or supplied internally. The reset request 31 is generated at an arbitrary timing when a user wishes to initialize a function of a certain circuit.

In response to the input reset request 31, the reset signal output unit 21 generates a mask control signal 33 to output to the clock mask control circuit 22, and the reset signal 36 to output to the functional blocks 24a to 24c. The reset signal output unit 21 outputs the reset signal 36 to each of the functional block 24a to 24c at the same time as or after outputting the mask control signal 33 to the clock mask control circuit 22.

The clock mask control circuit 22 is connected to the reset signal output unit 21 and the clock mask circuits 23a to 23c. The clock mask control circuit 22 generates clock mask signals 34a to 34c according to the mask control signal 33 output by the reset signal output unit 21, and outputs the generated clock mask signals 34a to 34c respectively to the clock mask circuits 23a to 23c. Further, the clock mask control circuit 22 is supplied with the original clock signal 32, and synchronizes with the original clock signal 32 to operate.

The clock mask circuits 23a to 23c are connected to the clock mask control circuit 22 and connected respectively to the functional blocks 24a to 24c. The clock mask circuits 23a to 23c (hereinafter referred to as the clock mask circuit 23 when not necessary to distinguish the clock mask circuits 23a to 23c) are disposed for each functional block. Therefore, the number of clock mask circuit 23 is determined by the number of functional block 24 to be connected. In this exemplary embodiment, the number of functional block 24 is three, thus three clock mask circuits 23 are disposed correspondingly. Note that there may be only one clock mask circuit 23 to control the supply of the clock signal 35 to all the functional blocks 24.

The clock mask circuits 23a to 23c supply and stop supplying the clock signals 35a to 35c (hereinafter referred to as the clock signal 35 when not necessary to distinguish the clock signal 35a to 35c) to be respectively supplied to the functional blocks 24a to 24c according to the clock mask signals 34a to 34c. The clock mask circuit 23 may be composed of an AND circuit, for example.

The functional blocks 24a to 24c are connected to each other, also to the reset signal output unit 21, and respectively connected to the clock mask circuits 23a to 23c. The functional blocks 24a to 24c are reset when the clock signals 35a to 35c and the reset signal 36 are supplied. The functional blocks 24a to 24c each receive the reset signal 36 from the reset signal output unit 21 and the clock signals 35a to 35c from the clock mask circuits 23a to 23c.

The functional blocks 24a to 24c are the internal circuits in LSI divided by function. The functional blocks 24a to 24c receive the control signals 37a to 37c output by other functional blocks 24a to 24c, and the functional blocks together operate to perform one function. There is no limitation in the number of division of the functional blocks. The larger the number of division is, the smaller the current will be at the time of initialization. Moreover, the smaller the number of division is, the shorter the time required to initialize the entire functional blocks. Note that in this exemplary embodiment, the number of the functional block 24 is three, however it is not limited to this, and may be two or more than three.

An operation of the semiconductor integrated device 20 at the time of resetting the functional blocks 24a to 24c is explained. The reset signal output unit 21 stops supplying the clock signals 35a to 35c to the functional blocks 24a to 24c, and supplies the reset signal 36 to the functional block 24 at the same timing as stopping the supply of the clock signals 35a to 35c. The clock mask control circuit 22 stops supplying the clock signals 35a to 35c, sequentially selects the functional block 24 to reset from the functional blocks 24a to 24c which are supplied with the reset signal 36, and supplies the clock signals 35a to 35c to the selected functional block 24.

The operation of the semiconductor integrated device 20 at the time of resetting the functional blocks 24a to 24c is further explained. First, the reset request 31 is externally input to the reset signal output unit 21.

In response to the reset request 31, the reset signal output unit 21 outputs the mask control signal 33 to the clock mask control circuit 22.

The clock mask control circuit 22 outputs the clock mask signals 34a to 34c to the clock mask circuits 23a to 23c.

The clock mask circuits 23a to 23c stop supplying the clock signals 35a to 35c to the functional blocks 24a to 24c according to the clock mask signals 34a to 34c. In response to this, the functional blocks 24a to 24c stop operation.

The reset signal output unit 21 supplies the reset signal 36 to the functional blocks 24a to 24c at the same time as stopping the supply of the clock signals 35a to 35c to the functional blocks 24a to 24c. Note that the reset signal 36 may not be supplied at the same time as stopping the supply of the clock signal 35 but may be after or concurrently with stopping the supply of the clock signal 35.

Next, the clock mask control circuit 22 sequentially selects the functional block 24 to reset from the functional blocks 24a to 24c which are supplied with the reset signal 36. For example, the case is explained hereinafter in which the functional blocks 24a, 24b, and 24c are selected in this order.

In this exemplary embodiment, the clock mask control circuit 22 sequentially supplies the clock signals 35a to 35c for the amount necessary to reset the selected functional blocks 24a to 24c.

The clock mask control circuit 22 controls the supply of the clock mask signal 34a, in order to supply the clock signal 35a for the amount necessary to reset the functional block 24a.

The clock mask circuit 23a supplies the functional block 24a with the clock signal 35a for resetting the functional block 24a by combining the original clock signal 32 and the clock mask signal 34a.

The functional block 24a is reset when the clock signal 35a is supplied.

After the functional block 24a is reset, in a similar manner, the clock signals 35b and 35c for the amount necessary to reset the other functional blocks 24b and 24c are sequentially supplied to the other functional blocks 24b and 24c according to the clock mask signal output by the clock mask control circuit, and the functional blocks 24b and 24c are reset. After supplying the clock signal to the functional block 24 to reset, the interval to supply the clock signal 35 to other functional block 24 to reset next is more than or equal to the time required for the current generated due to the influence of resetting the functional block 24 is reduced.

By repeating to reset by the interval more than or equal to the time in which the current generated due to the influence of reset reduced it is possible to prevent an overcurrent from flowing in the functional block 24.

Lastly, the reset request 31 is canceled, the reset signal 36 is deactivated, and the reset of the functional blocks 24a to 24c is completed.

Figure 3:
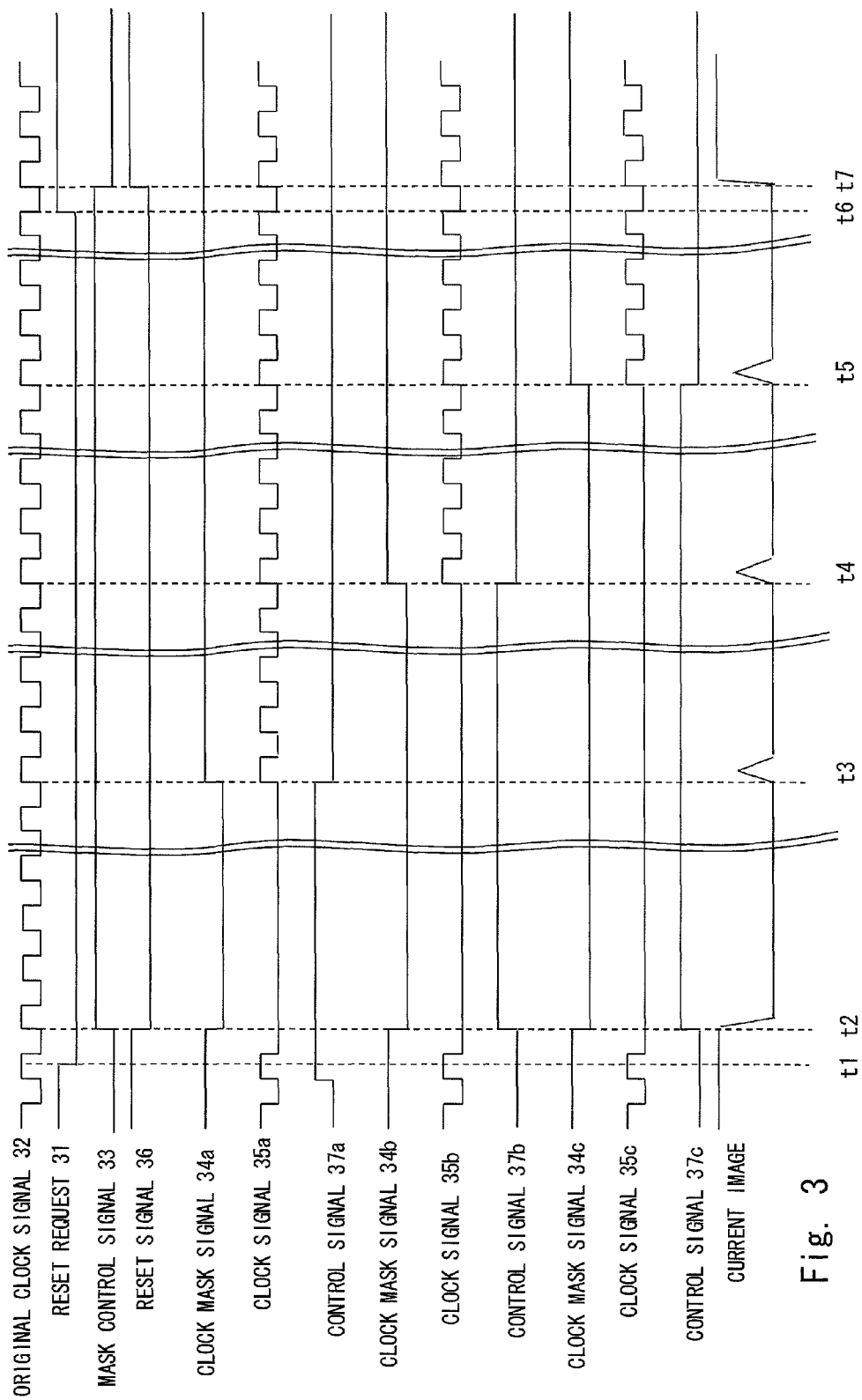
FIG. 3 is a timing chart according to a second exemplary embodiment.
Figure 4:
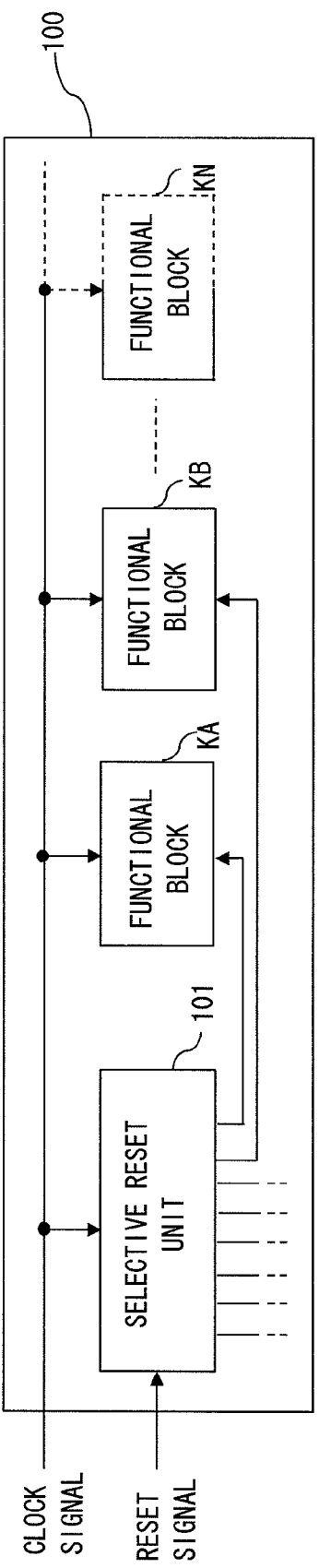
FIG. 4 illustrates a semiconductor integrated device according to a related art.

The operation of the semiconductor integrated device 20 is further described in detail. FIG. 3 is a timing chart according to this exemplary embodiment. First, the reset request 31 is activated at a timing t1 (low active) and input to the reset signal output unit 21.

In response to the reset request 31, the reset signal output unit 21 sets the mask control signal 33 to high-level at the timing t2, and at the same time, activates the reset signal 36 (low active). The clock mask control unit 22 which received the mask control signal 33 activates (low active) the clock mask signals 34a to 34c at almost the same time as the input of the mask control signal 33, and then outputs the clock mask signals 34a to 34c to the clock mask circuits 23a to 23c. The clock mask circuit 23 stops supplying the clock signals 35a to 35c to the functional blocks 24a to 24c according to the clock mask signals 34a to 34c.

If the supply of the clock signal 35 to all the functional blocks 24 is stopped, and the reset signal 36 is input to all the functional blocks 24, the clock mask signal control circuit 22 sets the clock mask signal 34a to high-level (low active) only for one clock. Since the clock mask signal 34a is set to high-level (low active) only for one clock at the timing t3, the clock signal 35a is supplied to the functional block 24a for only one clock at the same timing t3.

When the functional block 24a is initialized, the control signal 37a is initialized as well. However, as the clock signal 35b and the clock signal 35c are not respectively supplied to the functional block 24b and the functional block 24c, and the functional blocks 24b and 24c are not operating, there is no influence caused by the change in the control signal 37a.

When completing to reset the functional block 24a, in a similar manner, the remaining functional block 24 is sequentially reset at the timings t4 and t5. Note that only the clock signals 35a to 35c for one clock are illustrated for each of the functional blocks 24a to 24c in FIG. 3, however the clock signals 35a to 35c for two clocks or more may be supplied.

When the initialization of all the functional blocks 24 is completed, the reset request 31 is set to high-level (low active) at the timing t6. Then, the reset signal output unit 21 sets the reset signal 36 to high-level (low active) at the timing t7, and at the same time, sets the mask control signal 33 to low-level (high active) and also sets the clock mask signal 34a to 34c output by the clock mask control circuit 22 to high-level (low active). Then the reset is completed.

In this exemplary embodiment, since the functional block is not supplied with the clock signal except at the timing to be reset, the functional blocks not performing reset operation stops the operation. Therefore, even if there are a plurality of functional blocks operating by inputting or outputting signals to each other, the functional blocks will not be influenced by the signals from other functional blocks, and thus there is no possibility of generating a malfunction when resetting the functional blocks. Accordingly, one or more arbitrary functional blocks can be selected and sequentially reset, and thereby preventing an overcurrent from flowing in the circuit.

[Second Exemplary Embodiment]

Although a semiconductor integrated device 20 according to a second exemplary embodiment has the same circuit configuration as the first exemplary embodiment, the timing to supply the clock signal 35 is different from the first exemplary embodiment. In the first exemplary embodiment, the clock mask control circuit 22 supplies the clock signals 35a to 35c to the selected functional blocks 24a to 24c for the amount necessary to reset. On the other hand, the clock mask control circuit 22 of the second exemplary embodiment sequentially starts supplying the clock signal 35 to the selected functional block 24.

FIG. 3 is a timing chart according to the second exemplary embodiment. The second exemplary embodiment is same as the first exemplary embodiment except the following point, thus the repeated explanation is omitted. The point is that the clock signals 35a to 35c are input to the functional block 24 to reset and the functional block 24 which has completed to reset along with the change in the timings to output the clock mask signals 34a to 34c.

The operations till stopping the supply of the clock signal 35 to the functional block 24 and supplying the reset signal 36 to the functional block 24 which has stopped operation are same as the first exemplary embodiment.

At the timing t2, the supply of the clock signal 35 to the functional block 24 is stopped, and the reset signal 36 is supplied to all the functional block 24. Then, the clock mask signal control circuit 22 sets the clock mask signal 34a to high-level (low active) at the timing t3. At the same time as the clock mask signal 34a is set to high-level (low active), the clock mask circuit 23a supplies the clock signal 35a to the functional block 24a at the timing t3. At this time, in the second exemplary embodiment, the clock mask circuit 23a continues to supply the clock signal 35a to the functional block 24a, unlike the first exemplary embodiment in which only the necessary amount of the clock signal 35a to reset is supplied.

The functional block 24b is reset at the timing t4 in a similar manner as the functional block 24a.

As the clock mask signal 34a is set to high-level (low active) at the timing t3, in the functional block 24a, the reset signal 36 is low level (low active) and the clock signal 35a is supplied when the functional block 24b is reset at the timing t4. Therefore, the functional block 24a is reset every time. However, after the functional block 24a is reset once at the beginning, the functional block 24a which has already reset is reset again, and thus there is no operation actually performed. Moreover, since the reset is repeated each time, the control signal 37 supplied from other functional block 24 is disregarded, and the functional block 24a is not controlled by the other functional blocks. Accordingly, even if the clock signal is supplied to the functional block 24a, no malfunction is generated by the operation of the other functional blocks.

The same applies to when the functional block 24c is reset at the timing t5. In a similar way as the first exemplary embodiment, the initialization of all the functional block 24 is completed at the timing t6, and at the same time, the reset request 31 is set to high-level (low active). Then, the reset signal output unit 21 sets the reset signal 36 to high-level (low active) at the timing t7, and at the same time, sets the mask control signal 33 to low-level (high active). Then the reset is completed.

In a similar way as the first exemplary embodiment, operation clocks are received in the order of the functional blocks 24a, 24b, and 24c in FIG. 3, it is not limited to this.

In this exemplary embodiment, control of the clock mask signal 34 is easier than the first exemplary embodiment.

In this exemplary embodiment, the clock signals are supplied only to the functional blocks being reset and the functional blocks already reset. Thus there is no influence by the signals input and output between the functional blocks, and thereby not causing a malfunction at the time of resetting the functional blocks. Accordingly, one or more arbitrary functional blocks can be sequentially selected and reset, so as to prevent an overcurrent from flowing in the circuit.

The present invention is not limited to the above exemplary embodiments, but can be modified as appropriate without departing from the scope of the present invention.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A semiconductor integrated device comprising:
   a plurality of functional blocks;
   a reset signal output unit that outputs a reset signal for resetting the plurality of functional blocks;
   a clock mask circuit that stops a clock signal, the clock signal being supplied to the plurality of functional blocks; and
   a clock mask control circuit that controls the supply of the clock signal by the clock mask circuit to the plurality of functional blocks, wherein
   at least one of the functional blocks inputs or outputs a signal with other functional blocks, and the functional blocks are reset when the clock signal and the reset signal are supplied,
   the reset signal output unit supplies the reset signal to the plurality of functional blocks concurrently with or after the clock signal supply to the plurality of functional blocks is stopped, and
   the clock mask control circuit sequentially selects one or more of the functional block to reset among the plurality of functional blocks in which the supply of the clock signal is stopped and the reset signal is supplied.

2. The semiconductor integrated device according to claim 1, wherein the plurality of functional blocks operate together to perform one function.

3. The semiconductor integrated device according to claim 1, wherein the reset signal output unit supplies the reset signal to the plurality of functional blocks concurrently with or after the supply of the clock signal to the plurality of functional blocks is stopped.

4. The semiconductor integrated device according to claim 2, wherein the reset signal output unit supplies the reset signal to the plurality of functional blocks concurrently with or after the supply of the clock signal to the plurality of functional blocks is stopped.

5. The semiconductor integrated device according to claim 1, wherein the clock mask control circuit sequentially selects the functional block to reset among the plurality of functional blocks in which the clock signal supply is stopped and supplied with the reset signal.

6. The semiconductor integrated device according to claim 2, wherein the clock mask control circuit sequentially selects the functional block to reset among the plurality of functional blocks in which the clock signal supply is stopped and supplied with the reset signal.

7. The semiconductor integrated device according to claim 1, wherein the clock mask circuit is disposed for each functional block.

8. The semiconductor integrated device according to claim 2, wherein the clock mask circuit is disposed for each functional block.

9. The semiconductor integrated device according to claim 5, wherein the clock mask control circuit sequentially supplies the clock signal for an amount necessary to reset the selected functional block.

10. The semiconductor integrated device according to claim 6, wherein the clock mask control circuit sequentially supplies the clock signal for an amount necessary to reset the selected functional block.

11. The semiconductor integrated device according to claim 5, wherein the clock mask control circuit sequentially starts supplying the clock signal to the selected functional block.

12. The semiconductor integrated device according to claim 6, wherein the clock mask control circuit sequentially starts supplying the clock signal to the selected functional block.

13. A control method of a semiconductor integrated device including a plurality of functional blocks in which at least one of the functional blocks inputs or outputs a signal with other functional blocks and the functional blocks are reset when a clock signal and a reset signal are supplied, the control method comprising:
   stopping supply of the clock signal to the plurality of functional blocks;
   supplying the reset signal to the plurality of functional blocks concurrently with or after stopping the supply of the clock signal; and
   sequentially selecting one or more of the functional block to reset among the functional blocks in which the supply of the clock signal is stopped and supplied with the reset signal, and supplying the clock signal to the selected functional block.

14. The control method according to claim 13, further comprising supplying the reset signal to the plurality of functional blocks concurrently with or after stopping the supply of the clock signal.

15. The control method according to claim 13, wherein the supply and the supply stop of the clock signal to the functional block is performed for each of the functional block.

16. The control method according to claim 13, further comprising sequentially supplying the clock signal for an amount necessary to reset the functional block.

17. The control method according to claim 13, further comprising sequentially starting to supply the clock signal to the plurality of functional blocks.

* * * * *